(12) United States Patent
Albert et al.

(10) Patent No.: US 8,434,533 B2
(45) Date of Patent: May 7, 2013

(54) OPTIMIZED LOAD-BEARING STRUCTURE FOR BEARING SUPPORT AND OPTIMIZED BEARING SUPPORT

(75) Inventors: Loïc Albert, Clermont-Ferrand (FR); Xavier Brouwers, Poisy (FR); Guy Cagneaux, Nohanent (FR); Fabien Mondini, Lyons (FR); Sébastien Rigo, Manzat (FR); Peter Szekely, Pringy (FR); Adam J. Van Der Lelij, Vesenas (CH); Damien Van Der Zyppe, Champigny-sur-Marne (FR)

(73) Assignees: Michelin Recherche et Technique, S.A., Granges-Paccot (CH); E.I. Du Pont De Nemours and Company, Wilmington, DE (US)

( * ) Notice: Subject to any disclaimer, the term of this patent is extended or adjusted under 35 U.S.C. 154(b) by 663 days.

(21) Appl. No.: 12/160,540

(22) PCT Filed: Jan. 11, 2007

(86) PCT No.: PCT/EP2007/050262
§ 371 (c)(1),
(2), (4) Date: Oct. 5, 2010

(87) PCT Pub. No.: WO2007/080180
PCT Pub. Date: Jul. 19, 2007

(65) Prior Publication Data
US 2011/0017377 A1     Jan. 27, 2011

(30) Foreign Application Priority Data
Jan. 12, 2006   (FR) ...................................... 06 00279

(51) Int. Cl.
*B60C 17/00*     (2006.01)
*B60C 17/04*     (2006.01)

(52) U.S. Cl.
USPC ............................ 152/152; 152/516; 152/520

(58) Field of Classification Search .................. 152/520
See application file for complete search history.

(56) References Cited

U.S. PATENT DOCUMENTS

| 4,921,029 A | 5/1990 | Palinkas et al. ................. 152/11 |
| 6,564,842 B2 | 5/2003 | Abinal et al. ................. 152/516 |
| 2006/0201597 A1 | 9/2006 | Lacour ........................... 152/158 |

FOREIGN PATENT DOCUMENTS

| EP | 1 356 958 A1 | 10/2003 |
| EP | 1 466 760 A1 | 10/2004 |

(Continued)

OTHER PUBLICATIONS

Machine tranlsation of JP 2003-320822, 2003.*

*Primary Examiner* — Justin Fischer
(74) *Attorney, Agent, or Firm* — Fitzpatrick, Cella, Harper & Scinto

(57) ABSTRACT

A load-bearing structure for a bearing support intended to be mounted on a rim inside a tire fitted on a vehicle to support the tread of the tire in the event of a loss of inflation pressure is provided. The load-bearing structure includes a base, a crown, and an annular body connecting the base and the crown. The body includes a plurality of partitions distributed regularly circumferentially, extending axially substantially from one side to the other of the body and radially from the base to the crown with a mean orientation relative to the radial direction of between 10 and 50 degrees, in that two circumferentially adjacent partitions exhibit contrary orientations relative to the radial direction and in that two adjacent partitions define with the base and/or the crown cavities in the form of triangles or trapezoids.

33 Claims, 12 Drawing Sheets

FOREIGN PATENT DOCUMENTS

| | | |
|---|---|---|
| JP | 7-32827 A | 2/1995 |
| JP | 2003-320822 | * 11/2003 |
| WO | WO 00/76791 A1 | 12/2000 |
| WO | WO 2005/044598 A1 | 5/2005 |

* cited by examiner

OPTIMIZED LOAD-BEARING STRUCTURE FOR BEARING SUPPORT AND OPTIMIZED BEARING SUPPORT

The present invention relates to a bearing support for a vehicle tire intended to be mounted on a rim thereof, inside the tire, to support a load borne by the tire in the event of tire failure or of an abnormally low inflation pressure.

Numerous publications describe bearing supports. By way of example, publication WO 00/76791 discloses a bearing support that includes a substantially cylindrical base, intended to conform to a rim of a tire, a substantially cylindrical crown intended to come into contact with an internal part of the tire situated under its tread in the event of loss of pressure and leaving a clearance relative to the latter at the rated operating pressure of the tire, and an annular body connecting base and crown portions of the tire, in which the annular body consists of a plurality of radial partitions extending axially on either side of a circumferential median plane, distributed about a circumference of the support and connected in pairs by connecting members extending substantially circumferentially. In this document, the geometry of the partitions is adapted in their central portions to resist buckling under radial loading of the annular body. These annular body profiles make it possible to achieve very considerable structural rigidity for the support and thus to obtain very light supports for a given bearing capacity during flat running. It should be noted that reducing the weight of non-suspended rolling assemblies constitutes a major factor in vehicle performance and that lightening the support is therefore a very important issue.

However, although bearing supports are designed to meet bearing requirements during flat running, they must also disturb as little as possible the operation of the tire under normal conditions of use at rated inflation or operation pressure. This applies in particular when the tire accidentally meets with a localized obstacle, such as a pothole or a pavement portion, at an excessive speed. When such an accidental event occurs, the obstacle acts as a sharp edge and compresses the tire locally, so as to deform it. The obstacle then compresses the bearing support.

Document WO 2005/044598 discloses a bearing support similar to that of document WO 00/76791, in which the circumferential connecting members are interrupted by axial incisions of very small width. The presence of these axial incisions makes it possible to reduce a buckling threshold of the partitions in the event of an accidental impact without noticeably disturbing the tire's behavior in the event of flat running.

Document JP 07032827 presents a bearing support in which each partition has a circumferentially adjacent partition with a common zone appreciably laid out radially at mid-height of an annular body of the support.

The present invention, in an embodiment, provides a bearing support that improves substantially the compromise between performance under flat running conditions and in the event of an accidental impact.

The present invention, in an embodiment, provides a load-bearing structure for a bearing support intended to be mounted on a rim inside a tire fitted on a vehicle. This load-bearing structure includes a substantially cylindrical base, a substantially cylindrical crown, and an annular body connecting the base and the crown. This load-bearing structure is characterized in that the body includes a plurality of partitions distributed regularly circumferentially, extending axially substantially from one side to the other of the body and radially from the base to the crown with a mean orientation relative to a radial direction of between 10 and 50 degrees, in that two circumferentially adjacent partitions exhibit contrary orientations relative to the radial direction and in that two circumferentially adjacent partitions define, with cavities of the base and/or the crown in the form of triangles and/or trapezoids.

The geometry of the annular body, according to an aspect of the embodiment, makes it possible to design load-bearing structures for supports and supports with high initial structural rigidity, comparable to that of conventional supports, which provides them with good flat running behavior as well as ready buckling under localized stress in a contact patch or area, for example, in the event of an impact. This ready buckling substantially improves behavior in the event of an accidental impact, causing this behavior to resemble that of a tire on its own without bearing support. When the angle of the partitions relative to the radial direction is less than 10 degrees, the behavior of the partitions is very similar to that of radial partitions and thus the behavior in the event of an accidental impact deteriorates. On the other hand, when the angle of the partitions is greater than 50 degrees, it is noted that the geometry of the bearing support is too flexible and thus flat running behavior deteriorates.

Preferably, a ratio between a thickness of the partitions in their central portion and a radial height of the annular body is greater than 10%. Consequently, buckling of the partitions comes into play only considerably beyond the rated operating load in the event of flat running.

The load-bearing structures according to aspects of the present invention are such that the base includes materials whose modulus in extension is greater than a modulus in extension of materials constituting the crown. The bases conventionally include high modulus materials, such as cables made of steel or aramid, to ensure good behavior in the case of centrifugation at high speed. On the other hand, the crowns of the load-bearing structures do not include any material of higher modulus than the modulus of an essential constituent material of the load-bearing structure.

In an embodiment, adjacent partitions may exhibit, relative to the radial direction, mean inclinations by different angles alpha and beta. This embodiment makes it possible to take account of the existence of tangential forces during passage through the contact area.

Preferably, because the partitions include two external walls and an internally disposed median curve, each point of which is equidistant from the two external walls, the median curve is, at least for the central portion of the partitions, contained in one and the same median plane, known as the "median plane" of the partition.

The partitions thus preferably have a linear shape. This geometry reinforces the initial structural rigidity of the partitions by making them work compressively and not flexurally under radial load and also promotes a greater reduction in structural rigidity in the event of a localized impact after buckling of the stressed partitions.

Preferably, the external walls of the partitions are planar, at least in their central portion.

According to an embodiment, when two adjacent partitions exhibit an intersection between their median planes disposed radially between the base and the crown, these two partitions are extended radially as far as the base or the crown, as appropriate, by a common part and the assembly is generally Y-shaped in all circumferential planes.

This makes it possible easily to adapt the geometry of the partitions as a function of the geometries and loads necessary for bearing the loading of different types of tires.

It should be noted that a value of the mean orientation, alpha, beta, of the partitions is determined by taking into account the angle between the radial direction and the intersections between the median curve of the partitions and on the one hand the base and on the other hand the crown.

Advantageously, looking at three circumferentially adjacent partitions, the first two being in the shape of a V, such that the two ends of the V are at the level of the crown, L being the circumferential distance separating the two points of intersection of the median planes of the first two partitions with the crown, and l being the circumferential distance separating the points of intersection with the crown of the median planes of the second and third partitions, the following is the case:

$$0 \le \frac{l}{L} \le 1.$$

Consequently, at the level of the junction between the body and the crown, the distance between the ends of two adjacent partitions may vary between 0 and L.

Preferably, the following is the case:

$$0.80 \le \frac{l}{L} \le 1.$$

This makes it possible to obtain substantially the same mechanical behavior for the load-bearing structure of the support and for the support whatever its azimuth by minimizing the stress differences within the partitions as well the differences in circumferential rigidity in the event of crushing on flat ground.

According to another embodiment, the body additionally includes connecting partitions distributed regularly between two adjacent partitions and oriented circumferentially. These connecting partitions preferably exhibit radial orientation. They may also exhibit axial orientation.

These connecting partitions reinforce the structural rigidity of the load-bearing structure of the support under a low load as well as the resistance to relative rotation of the crown relative to the base, which increases the life of the load-bearing structure and of the bearing support when running flat.

The connecting partitions may constitute a circumferentially continuous web.

The connecting partitions may also connect only a given fraction of the partitions and preferably half of said partitions.

Advantageously, the thickness ratio between the connecting partitions e and the partitions E is such that:

$$0.1 < \frac{e}{E} < 0.5.$$

Respect for the maximum value of this ratio ensures that the partitions play only a secondary role in bearing the load, which allows the partitions to play their role fully in the event of localized buckling. The minimum limit is associated with issues relating to the possibility and ease of molding.

The connecting partitions may also include holes. These holes make it possible to reduce the weight of the load-bearing structure of the support and of the support without any detrimental effect on the mechanical role of the connecting partitions.

According to one advantageous embodiment, the connecting partitions are oriented by several degrees relative to the circumferential direction and preferably less than 10 degrees. This circumferential orientation reinforces the resistance of the load-bearing structure of the support to overall rotation of the crown relative to the base.

According to another advantageous embodiment, the partitions exhibit an axial inclination of several degrees. This makes it possible to increase their structural rigidity substantially.

Preferably, the axial inclination of the partitions is less than 10 degrees.

According to another embodiment, in the load-bearing structures for the support, the partitions define with the base and the crown cavities whose walls are substantially planar and connected by surfaces with a radius of curvature greater than one mm. This makes it possible to achieve good fatigue resistance in the event of flat running.

According to yet another embodiment, each of the partitions consists of two parallel partitions connected at each end by a radially oriented partition.

This embodiment has the advantage of conforming to load-bearing structures for supports with a greater distance between the base and the crown without needing substantially to increase the thickness of the partitions, which could cause problems with regard to practical implementation, in particular when the load-bearing structures and/or the supports are produced by injection-molding.

The principal constituent material of the load-bearing structures according to an embodiment of the invention may be a rubber mix with a modulus of elasticity of between 10 and 40 MPa; it may also be a polyurethane elastomer with a modulus of elasticity of between 30 and 400 MPa. According to one preferred variant, it may also be a thermoplastic elastomer with a modulus of elasticity of between 50 and 800 MPa and preferably between 50 and 500 MPa. The modulus in tension is a modulus measured at 23° C. to ISO standard 527/2.

Advantageously, the principal material is a polymer selected from among the following: elastomeric copolyether-esters, elastomeric copolyester-esters, block copolyether amides, thermoplastic polyether polyurethanes, thermoplastic polyester polyurethanes, polyamide 6 (caprolactam polymer) preferably with impact modifier or plasticizer, polyamide 11 (aminoundecanoic acid polymer) preferably with impact modifier or plasticizer, polyamide 12 (laurolactam polymer), preferably with impact modifier or plasticizer, polyamide 6/polyamide 12 copolymers, preferably with impact modifier or plasticizer, polyamide 66, preferably with impact modifier or plasticizer, polybutylene terephthalate (PBT), preferably with impact modifier or plasticizer, thermoplastic olefin elastomers, thermoplastic styrene elastomers, thermoplastic vulcanized rubbers (TPV), and mixtures of these polymers.

The polyamides are advantageously selected from among the following: polyamide 6 (caprolactam polymer) preferably with impact modifier or plasticizer, polyamide 11 (aminoundecanoic acid polymer) preferably with impact modifier or plasticizer, polyamide 12 (laurolactam polymer) preferably with impact modifier or plasticizer, polyamide 66 preferably with impact modifier or plasticizer, polyamide 10 preferably with impact modifier or plasticizer, polyamide 1010 preferably with impact modifier or plasticizer, polyamide 6/polyamide 12 copolymers preferably with impact modifier or plasticizer, polyamide 6/polyamide 10 copolymers preferably with impact modifier or plasticizer, polyamide 6/polyamide 12 copolymers preferably with impact modifier or plasticizer.

Preferably, the principal material is a polymer selected from among the following: elastomeric copolyether-esters, elastomeric copolyester-esters, block copolyether amides, thermoplastic polyether polyurethanes, thermoplastic polyester polyurethanes and mixtures of these polymers.

All of the above polymers may advantageously contain additives and reinforcing products, such as glass, stone, ceramic, silica or mineral fibers or particles (including nanoparticles), inter alia.

An aspect of the present invention also provides a bearing support that includes a load-bearing structure, in which a base of the load-bearing structure constitutes, at least in part, a base of a support intended to conform to a rim, and in which a crown of the load-bearing structure constitutes, at least in part, a crown of the support intended to come into contact with an internal part of a tire situated under the tire's tread in the event of a loss of inflation pressure and leaving a clearance relative to the latter at the rated operating pressure of the tire.

According to an embodiment, the bearing support according to an aspect of the invention includes a plurality of axially adjacent load-bearing structures according to an aspect of the invention.

Such a support may include two load-bearing structures according to an aspect of the invention.

Preferably, with the two load-bearing structures have partitions disposed circumferentially with a pitch p, and the two load-bearing structures are offset circumferentially by p/2.

Such a support, which includes two load-bearing structures of geometries offset circumferentially by p/2, has a more constant mechanical response as a function of its azimuth.

It is also possible to arrange the partitions in such a way that the first load-bearing structure has partitions oriented relative to an axial direction at different angles alpha and beta, the second load-bearing structure has partitions oriented relative to a radial direction at angles beta and alpha.

Additionally, this support may thus adapt itself to the two possible travel directions.

An embodiment of the present invention also provides a tread bearing support that includes two radially adjacent load-bearing structures according to an aspect of the invention.

Such a support may be arranged such that:
- a base of a load-bearing structure disposed radially towards the inside constitutes, at least in part, a base of the support;
- a crown of a load-bearing structure disposed radially towards the outside constitutes, at least in part, a crown of the support;
- a crown of the load-bearing structure disposed radially towards the inside coincides with the base of the load-bearing structure disposed radially towards the outside; and
- supporting partitions of the two load-bearing structures disposed radially opposite one another are connected to a common base/crown structure at the same azimuths and extend away from the common base/crown structure with contrary orientations relative to a radial direction.

An embodiment of the present invention also provides a tread bearing support that includes a load-bearing structure according to an aspect of the invention and furthermore includes locking elements extending the load-bearing structure axially on one side of the support.

Preferably, these locking elements axially extend the supporting partitions of the load-bearing structure as well as a base of the load-bearing structure at right angles to the supporting partitions.

The locking elements may also include means for detachably mounting a wheel module. Such a wheel module is conventionally used, in particular, to monitor an inflation pressure of a tire.

Other features and advantages of aspects and embodiments of the present invention will become evident from the description given below with reference to the appended drawings, which show, by way of non-limiting examples, embodiments and aspects of the subject matter of the invention:

Hereafter, the same reference numerals will be used for identical elements of the supports and the load-bearing structures shown in FIGS. 1 to 22.

Figure 1:
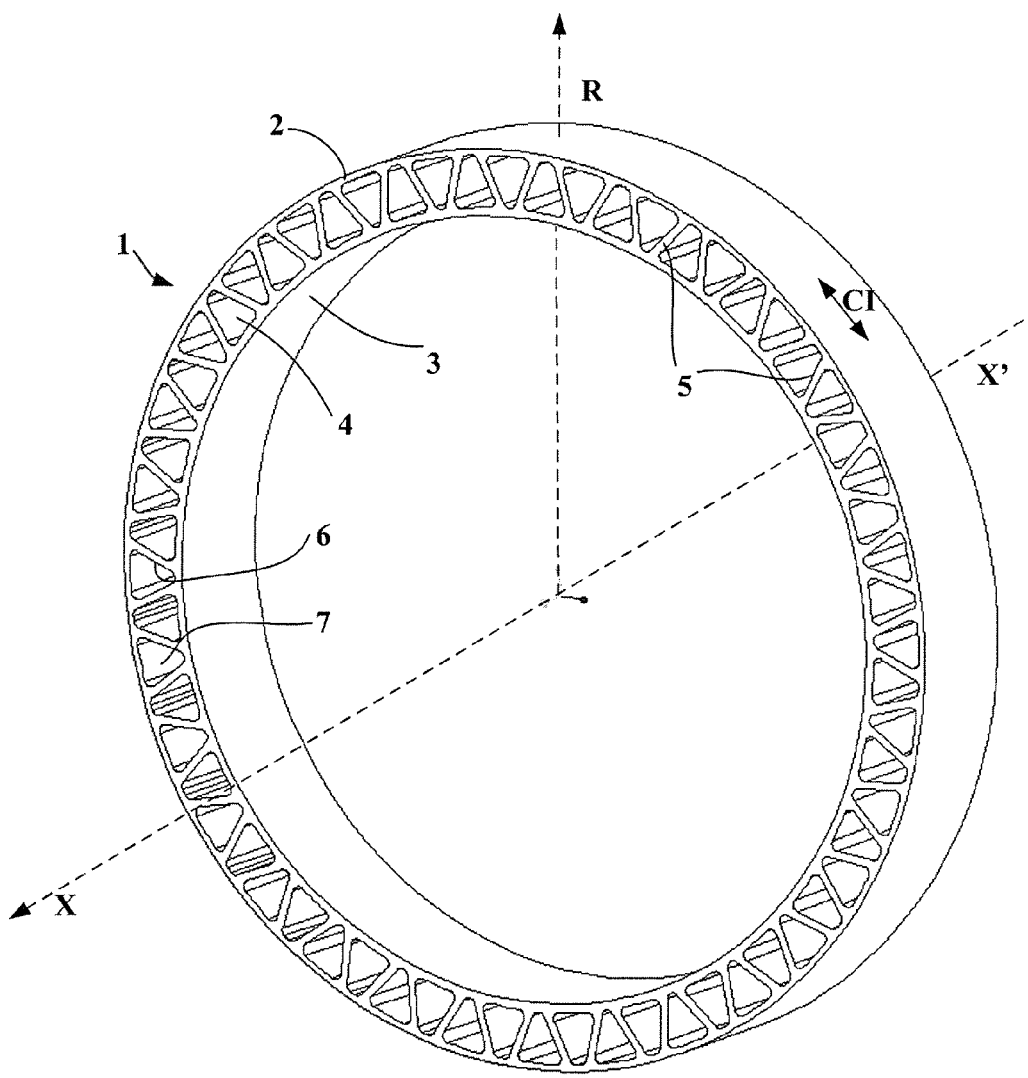
FIG. 1 is a simplified schematic perspective view of a load-bearing structure for a bearing support, according to an embodiment of the present invention.

A load-bearing structure 1, such as illustrated in the schematic view of FIG. 1, includes a substantially cylindrical base 3, a crown 2, and a body 4 connecting the base to the crown.

This load-bearing structure 1 conventionally constitutes all or part of a bearing support for a tire tread. The base 3 is intended to conform to a rim (not shown) and the crown is intended to come into contact with the internal part of the tire situated under the tread in the event of a loss of pressure. The base 3 conventionally includes circumferential reinforcements of high modulus, not shown, for countering centrifugation forces arising when traveling at high speed.

As shown in FIG. 1, an axial direction XX' is a direction substantially parallel to generatrices of cylinders formed by the base or the crown. A radial direction R is a direction perpendicular to the axial direction, and a circumferential direction CI is perpendicular to the above two directions and tangential to the cylinders formed by the base or the crown.

Figure 2:
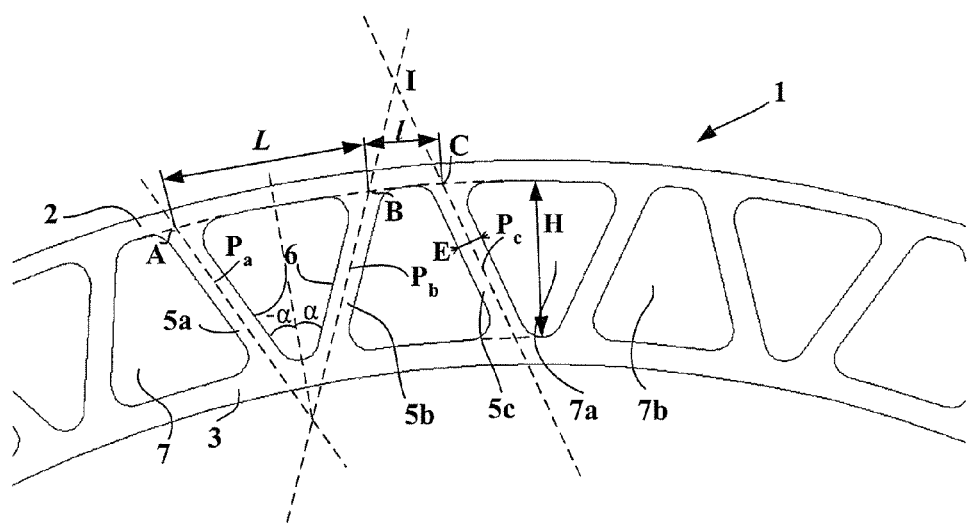
FIG. 2 is a view in partial circumferential section of the load-bearing structure of FIG. 1.

An annular body 4 of the load-bearing structure 1 is composed of partitions 5, as illustrated in particular in the FIGS. 1 and 2. FIG. 2 is a view in partial circumferential section of the load-bearing structure of FIG. 1. The term circumferential section should be taken to mean a section along a plane normal to the axis direction XX', i.e., the axis of rotation. The partitions 5 extend axially substantially from one side to the other of the annular body and radially from the base 3 to the crown 2.

Looking at three partitions 5a, 5b, and 5c disposed successively in the circumferential direction CI in FIG. 2, these three partitions are oriented alternately by +alpha ($\alpha$) and −alpha (−a). The angle alpha ($\alpha$) is defined relative to the radial direction R. Two adjacent partitions always exhibit opposite orientations relative to the radial direction. For the partitions in FIG. 2, the angles alpha have a value of the order of 20 degrees.

Each partition 5 includes two external walls 6 and a median curve disposed inside the partition, each point of which is equidistant from the two external walls. The median curve of each of the partitions of FIG. 2 is contained in one and the same median plane known as median plane P of the partitions. It should be noted that the external walls 6 are also planar.

The external walls 6 of the partitions 5 define with the base 3 and the crown 2 cavities 7 generally triangular 7a or trapezoidal 7b in form. Junction zones between two walls exhibit radii of curvature of a value greater than 1 mm, so as to ensure that the support exhibits good endurance when running flat.

Looking at the three partitions 5a, 5b, and 5c disposed successively in the circumferential direction in FIG. 2, the first two being in the form of a V such that the two ends of the V are at the level of the crown, it is possible to define points A, B and C as intersections between median planes $P_a$, $P_b$, and $P_c$ of these three partitions 5 and the radially inner surface of the crown 2. The distance between the points A and B is referred to herein as L and the distance between the points B and C as l. The distance AB corresponds to the distance separating the first two partitions, at the level of the crown, and the distance BC to that separating the second partition 5b from the third 5c. In FIG. 2, the ratio l/L is of the order of 0.37.

The ratio l/L preferably varies between 0 and 1. When the ratio is equal to 0, the points B and C coincide. When the ratio is equal to 1, B is equidistant from A and C. In this latter case, transmission of forces between the crown of the tire and the crown of the load-bearing structure of a support is more even as a function of the azimuth. Preferably, ratios are obtained of between 0.8 and 1.

Figure 5:
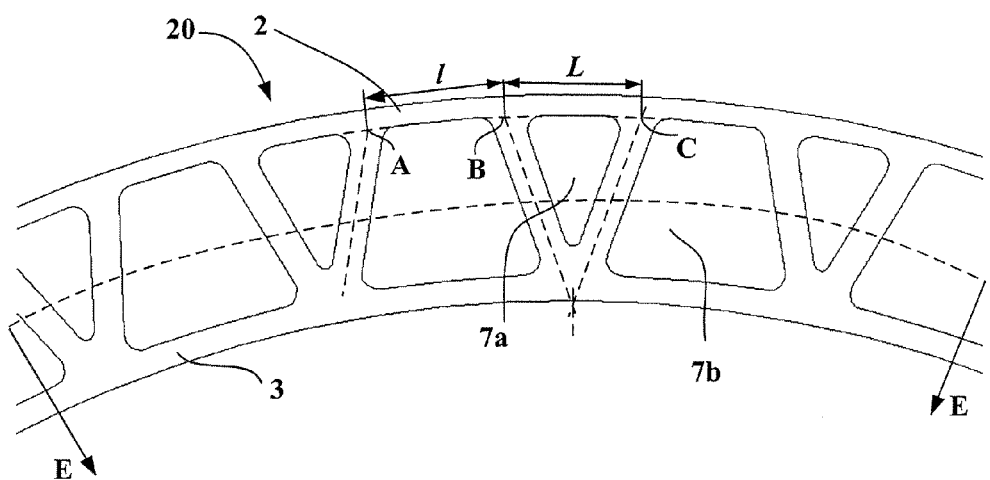
FIG. 5 is a view similar to FIG. 2, of a third embodiment of the present invention.

FIG. 5 shows a load-bearing structure 20 in which the ratio l/L is substantially equal to 1.

FIG. 2 also shows that a thickness E of the partitions in their central portions is considerable relative to a radial height H of the annular body 4. The ratio E/H is greater than 10% (i.e., greater than 0.1). The consequence of this is that normal operation of the partitions during flat running involves being stressed mainly compressively, with buckling being suffered only significantly beyond the rated operating load during flat running. This ratio must not be too high to allow the partitions to buckle in the event of an impact, such as with a pothole.

Figure 3:
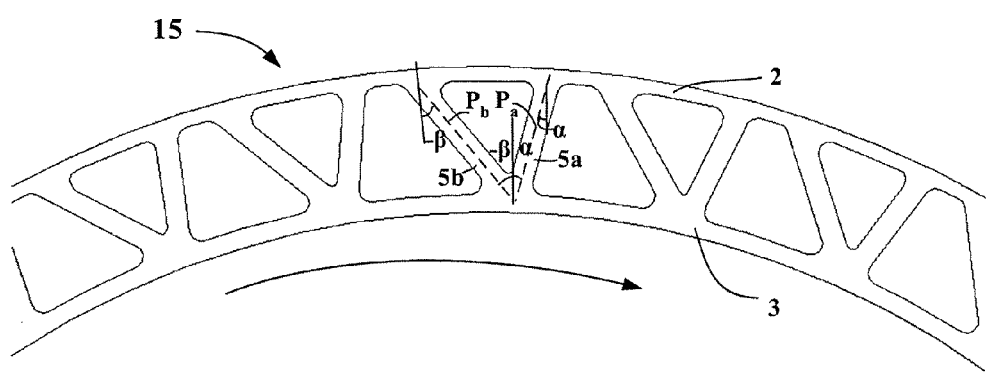
FIG. 3 is a view in partial circumferential section of a load-bearing structure with different angles of inclination of the partitions ($\alpha$, $\beta$), according to an embodiment of the present invention.

FIG. 3 illustrates a load-bearing structure 15 similar to that of FIGS. 1 and 2, apart from the angles of inclination of the partitions 5, which differ as a function of their orientation. Partition 5a is inclined by angle alpha ($\alpha$) relative to the radial direction, and partition 5b is inclined by angle −beta (−$\beta$). Angle alpha is smaller than angle beta. This embodiment makes it possible to take into account the existence of tangential forces during passage through a contact area of the tire. This support 15 preferably is disposed in a wheel/tire assembly in such a way that its direction of rotation corresponds to the arrow as indicated in FIG. 3.

Figure 4:
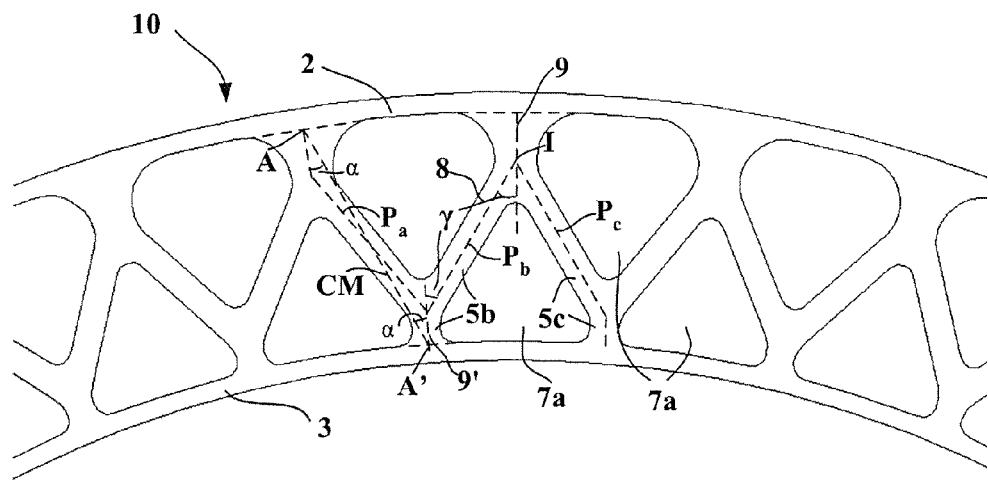
FIG. 4 is a view similar to FIG. 2, of a second embodiment of the present invention.

FIG. 4 exhibits a load-bearing structure 10 in which two adjacent partitions 5b and 5c have their median planes $P_b$ and $P_c$ with an intersection I disposed radially to the inside of the annular body 4. These two partitions are extended radially from this intersection as far as the crown 2 by a radially oriented common element 9. These two partitions thus take the shape of a Y. In FIG. 4, each partition 5 includes, on either side of a planar element 8 of inclination gamma ($\gamma$) relative to the radial direction, an element 9 common to it and the adjacent partition, oriented radially and extending as far as the crown or the base. The mean orientation of the partitions 5 is defined by the inclination alpha ($\alpha$) relative to the radial direction of a straight line CM that connects an intersection A between the element 9 of the partition 5 and the crown and an intersection A' between an element 9' of the partition 5 and the base. The angle alpha ($\alpha$) is of course less than or equal to the inclination gamma ($\gamma$) of the planar element 8 the partitions 5.

Figure 6:
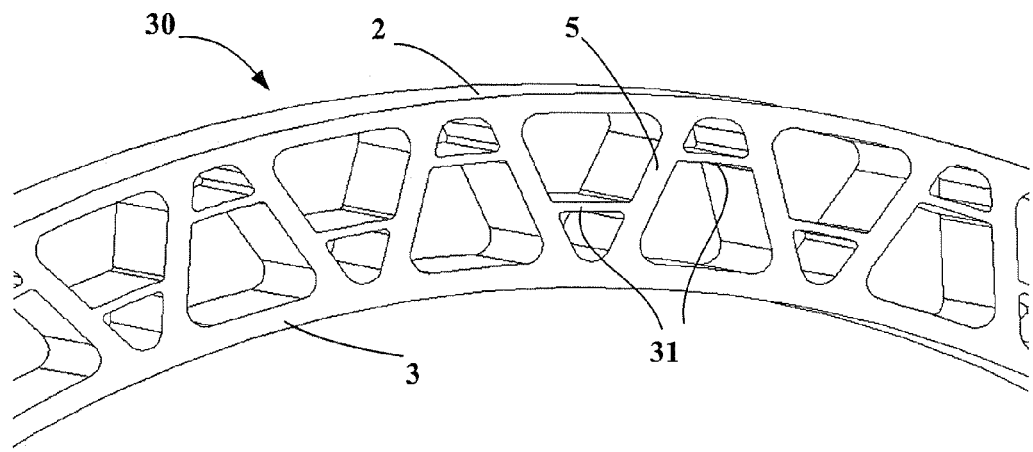
FIG. 6 is a view similar to FIG. 2, of a fourth embodiment of the present invention.

FIG. 6 shows a load-bearing structure 30 in which the partitions 5 are connected in pairs by connecting partitions 31. These connecting partitions 31 are planar and oriented axially and circumferentially. They serve to reinforce resistance to overall rotation of the base relative to the crown during flat running without increasing disadvantageously the structural rigidity of the load-bearing structure.

Figure 7:
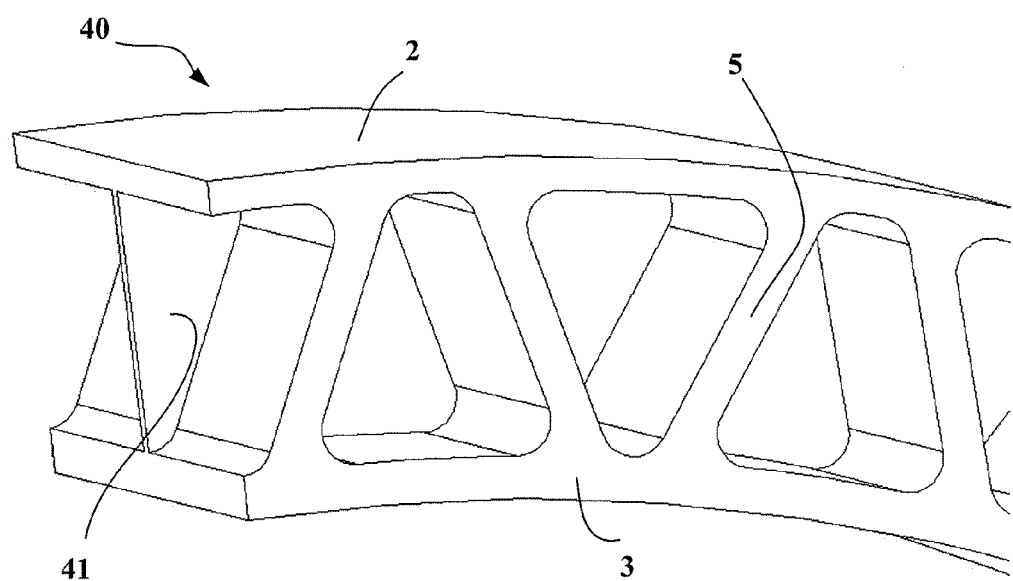
FIG. 7 shows an aspect of a fifth embodiment of the present invention.

FIG. 7 illustrates an embodiment in which the connecting partitions form a continuous web 41 oriented circumferentially and radially. Such a web 41, even if thin, is very effective in reinforcing the resistance of the load-bearing structure 40 to overall rotation of the base 3 relative to the crown 2.

Figure 8:
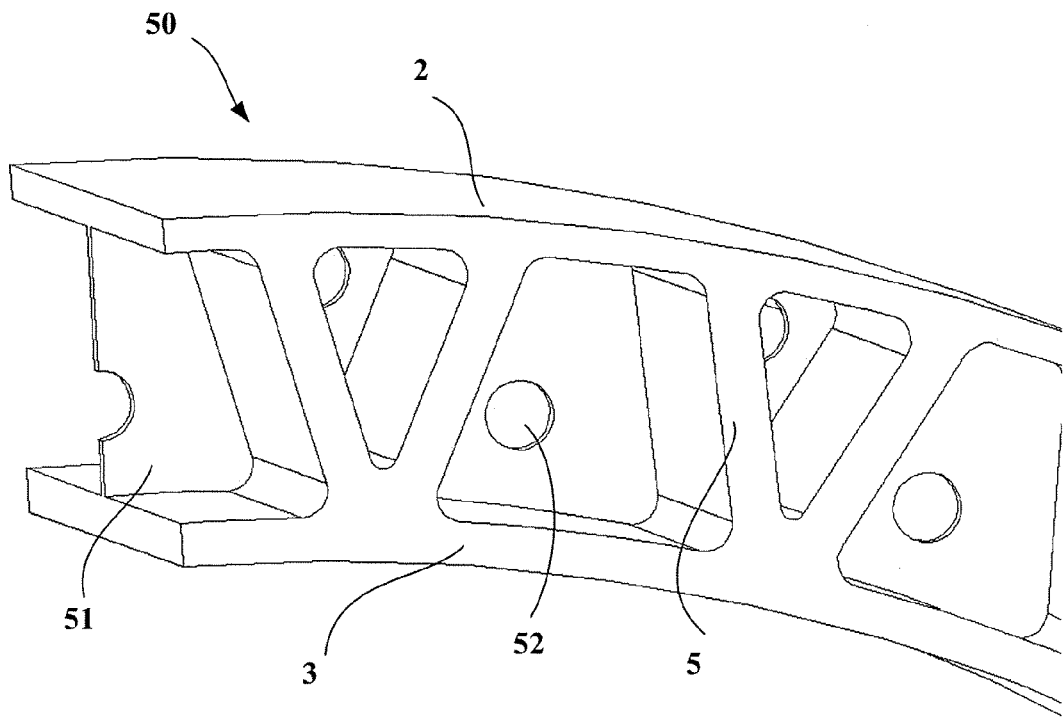
FIG. 8 shows an aspect of a sixth embodiment of the present invention.

FIG. 8 illustrates a load-bearing structure 50, very similar to the structure 40, in which the connecting partitions 51 form a circumferentially and radially oriented web perforated with holes 52. These holes make it possible to reduce the mass of the web 51 without substantially modifying its mechanical effects.

Figure 9:
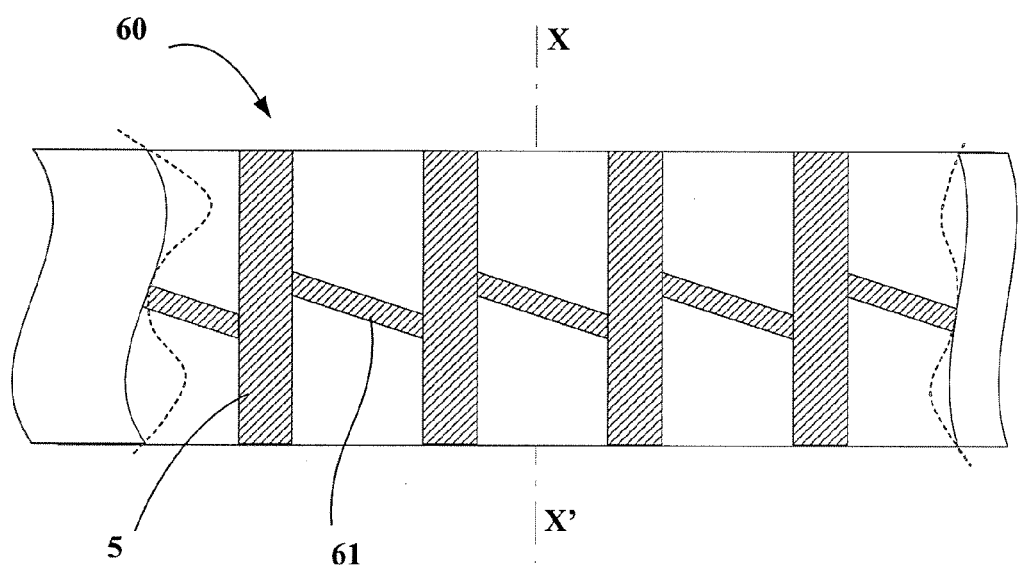
FIG. 9 shows an aspect of a seventh embodiment of the present invention, along section line EE as indicated in FIG. 5.

FIG. 9 illustrates a load-bearing structure 60, viewed in section EE as indicated in FIG. 5, in which the connecting partitions 61 are disposed radially and inclined by several degrees relative to the circumferential direction. The load-bearing structure 60 of FIG. 9 is a variant of the load-bearing structure of FIG. 7 (which uses a web to reinforce the strength of the load-bearing structure). The web's inclined arrangement breaks the continuity thereof, thus making it possible to avoid the transmission of tangential forces resulting from rotation of the assembly and to reduce stress concentrations at the web/partition junction.

Figure 10:
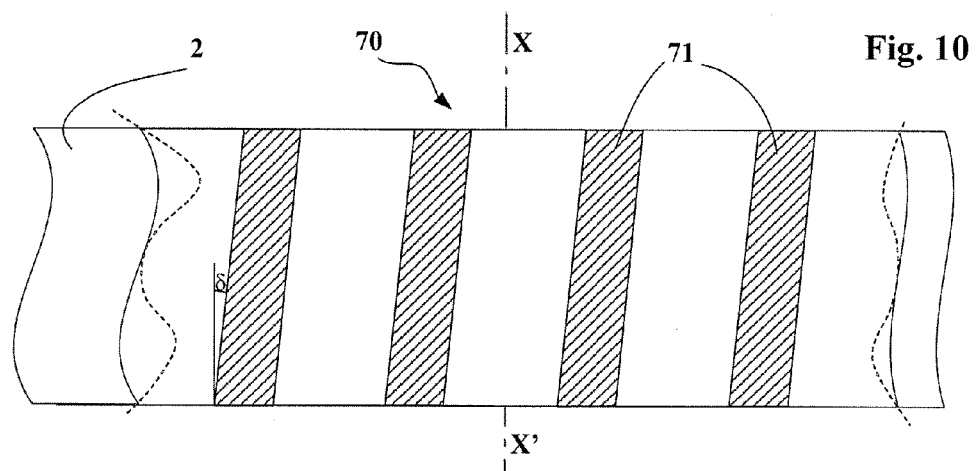
FIG. 10 shows an aspect of an eighth embodiment of the present invention, along section line EE as indicated in FIG. 5.

FIG. 10 shows a load-bearing structure 70, viewed in section EE as indicated in FIG. 5, in which the partitions 71 are oriented axially by an angle delta ($\delta$) of several degrees. The angle delta is less than 10 degrees. This orientation delta reinforces resistance to overall rotation of the base relative to the crown. This is an alternative solution to the connecting partitions of the previous examples.

Figure 11:
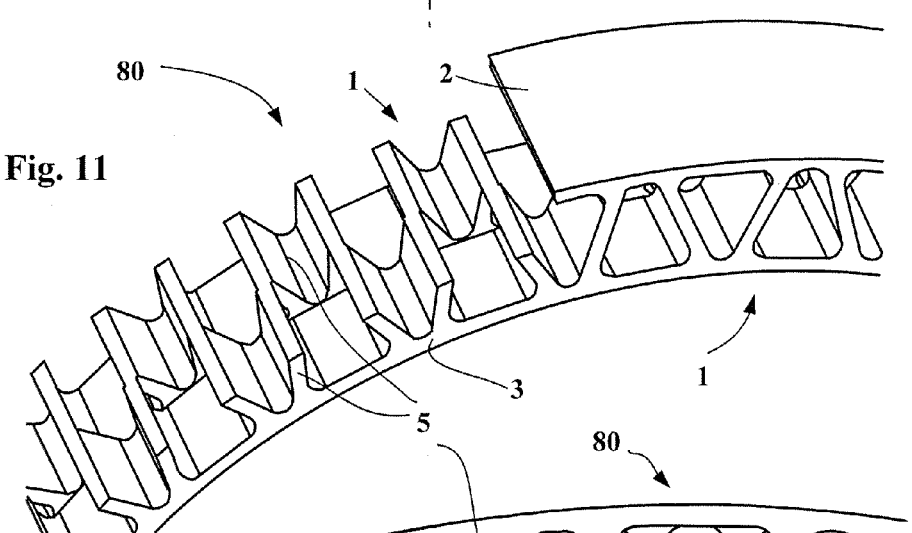
FIG. 11 is a partially open perspective view of an aspect of a ninth embodiment of the present invention.
Figure 12:
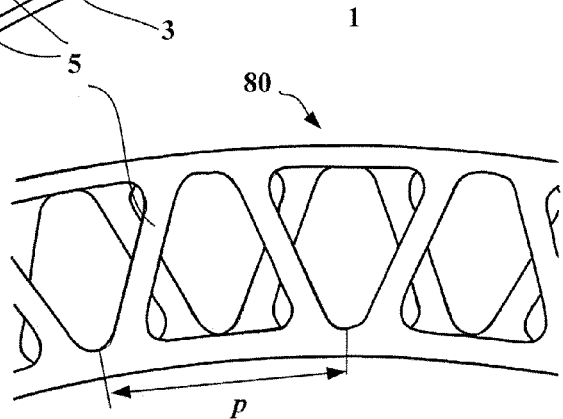
FIG. 12 is a view from a side of a support of FIG. 11.

FIGS. 11 and 12 show a load-bearing structure 80 that includes two axially disposed load-bearing structures 1. Each load-bearing structure has its partitions 5 disposed according to a pitch p and the two load-bearing structures are joined with a circumferential offset of p/2 relative to one another. This makes it possible to improve flat running evenness even more.

Figure 13:
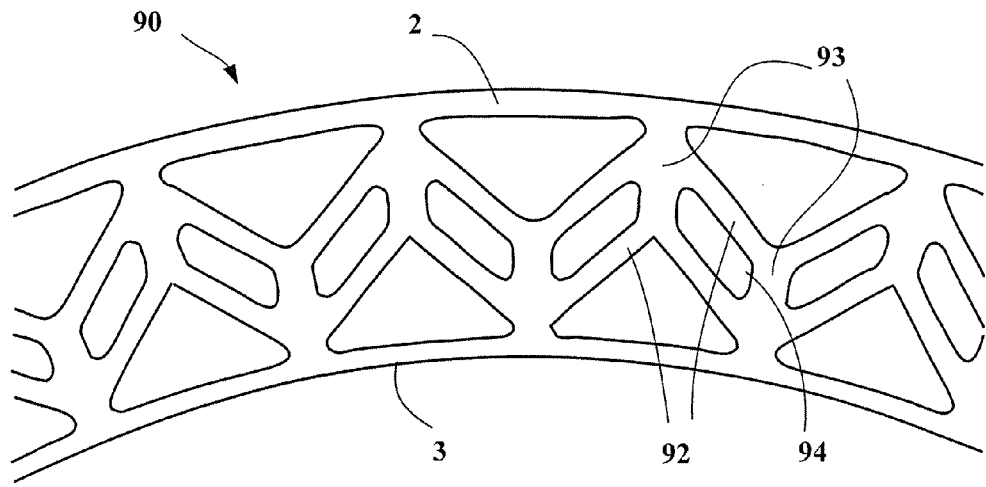
FIG. 13 shows an aspect of a tenth embodiment of the present invention, in radial circumferential section.

FIG. 13 shows a load-bearing structure 90 in which the partitions 91 consist of two parallel elements 92, inclined relative to the radial direction and connected at each end by an element 93 of radial orientation extending radially as far as the base or the crown. The advantage of this embodiment is that it makes it possible to produce radially taller load-bearing structures and supports. This is an alternative solution to the thicker partitions 5 that would be necessary to withstand the corresponding loads. The two elements 92 define with the elements 93 cavities 94 in the form of parallelograms. The elements 92 are of reduced thickness, which makes it possible to do away with molding problems that could be encountered with thicker partitions.

Figure 14:
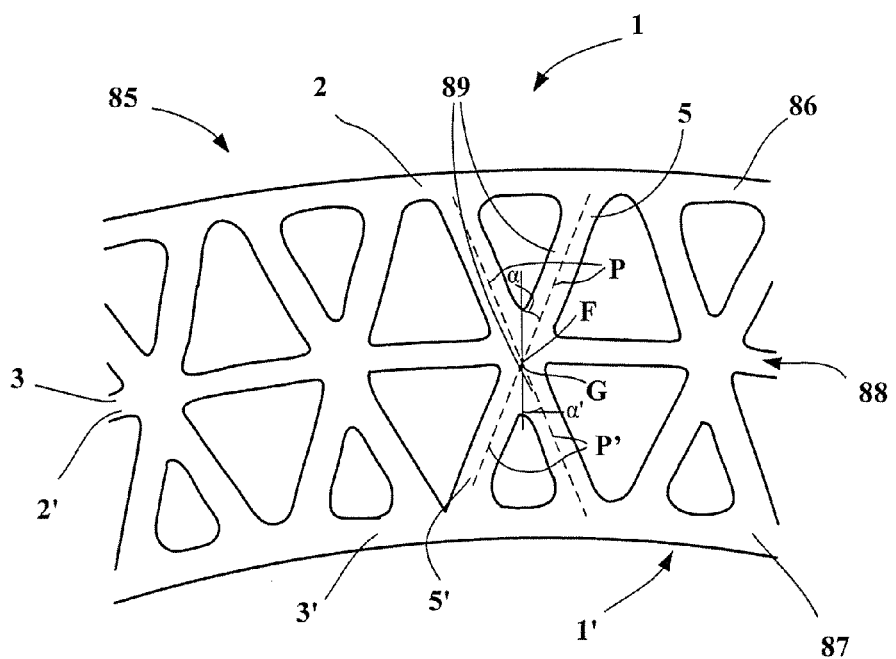
FIG. 14 shows an alternative example of a tall support, according to an embodiment of the present invention.

An alternative solution to the embodiment of FIG. 13 is shown in FIG. 14. FIG. 14 shows a load-bearing structure 85 consisting of two radially adjacent load-bearing structures 1 and 1'.

This load-bearing structure 85 includes a base 87 consisting of a base 3' of the load-bearing structure 1', a crown 86 consisting of the crown 2 of the load-bearing structure 1 and an annular body consisting of the annular bodies of the two structures 1 and 1' as well as a circumferentially and axially oriented web 88 corresponding to the base 3 of the structure 1 and a crown 2' of the structure 1', which coincide.

The annular body includes partitions 89 each constituting a partition 5 of the structure 1 and a partition 5' of the structure 1'. It should be noted that intersections F and G, respectively, between the two median planes P and the two median planes P' of two adjacent partitions 5 and two adjacent partitions 5', the partitions 5 and 5' being radially adjacent, are disposed substantially at the same azimuth. This makes it possible to achieve good transmission and good distribution of forces between the two structures 1 and 1' in the event of flat running. Furthermore, the partitions 5 and 5' extend away from the common base/crown structure or web 88 at contrary or diverging orientations relative to the radial direction. The angles alpha and alpha' may have different values but one is positive and the other negative as indicated in FIG. 14.

A support according to embodiments of the present invention is molded using an elastomeric copolyether-ester having hard segments composed of polybutylene terephthalate, and approximately 40% by weight of soft segments composed of polyether terephthalate. The fraction of hard segments is approximately 60% by weight. The polyether blocks are derived from polytetramethylene glycol and have a molecular weight of approximately 1000 g/mol. The copolyether-ester has a modulus in tension at 23° C., in accordance with ISO standard 527/2, of approximately 180 MPa.

This support (FIG. 2) is molded using an injection molding machine for thermoplastic materials, whose clamping force is such as to maintain a pressure on the material of the order of 600 MPa, which is held at this value for approximately one minute. The mould is supplied via a multi-runner network, the number of runners being equal to that of the cavities. The cycle time for this support is of the order of two minutes.

Figure 20:
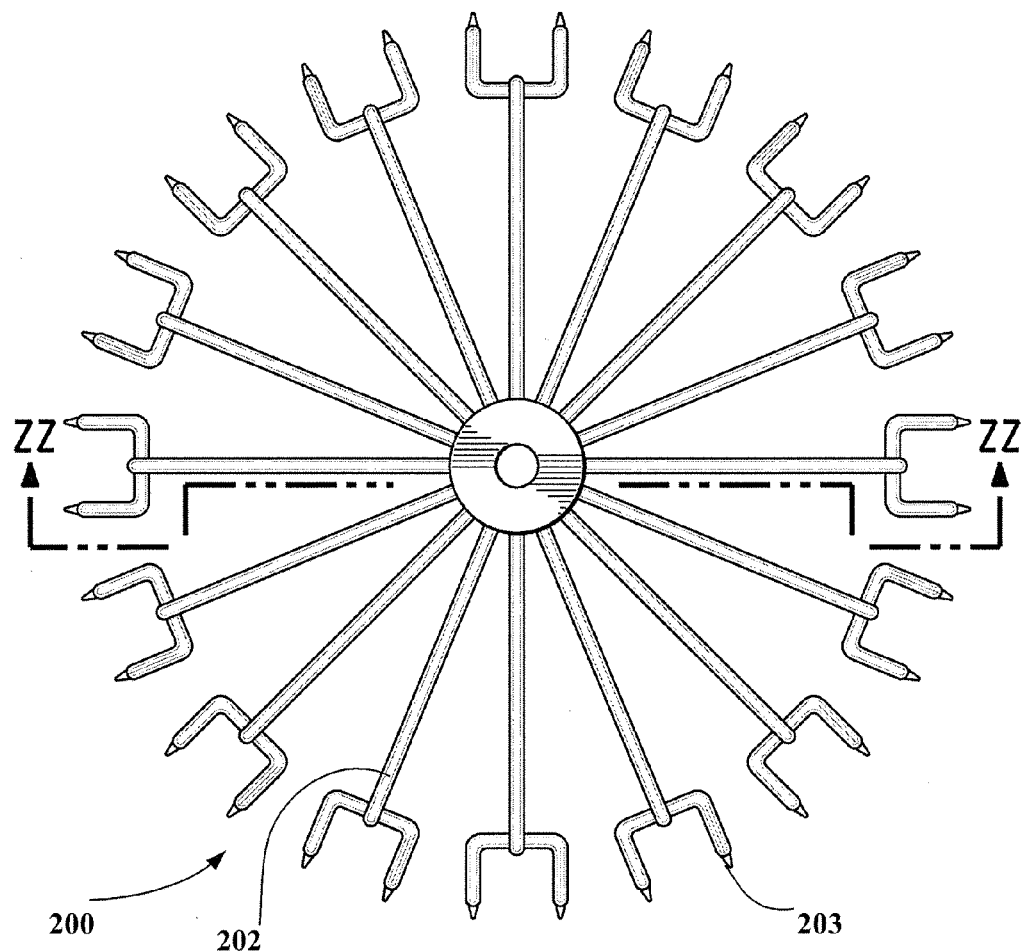
FIG. 20 is a plan view of all the runners for injection-molding a support, according to an embodiment of the present invention.
Figure 21:
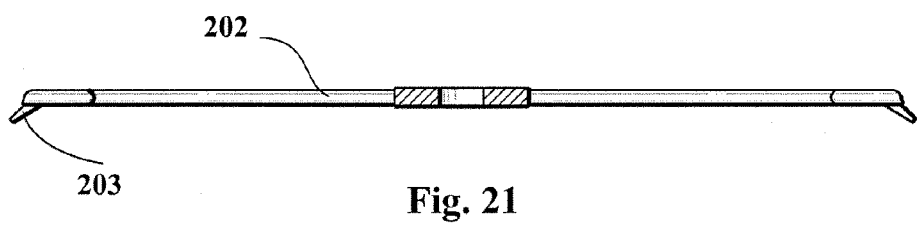
FIG. 21 is a view along section line ZZ as indicated in FIG. 20.

FIGS. 20 and 21 show an example of a multipoint supply system 200 that includes runners 202 and injection gates 203 of a "submarine" type for a mould intended to mould a support according to embodiments of the present invention.

Figure 15:
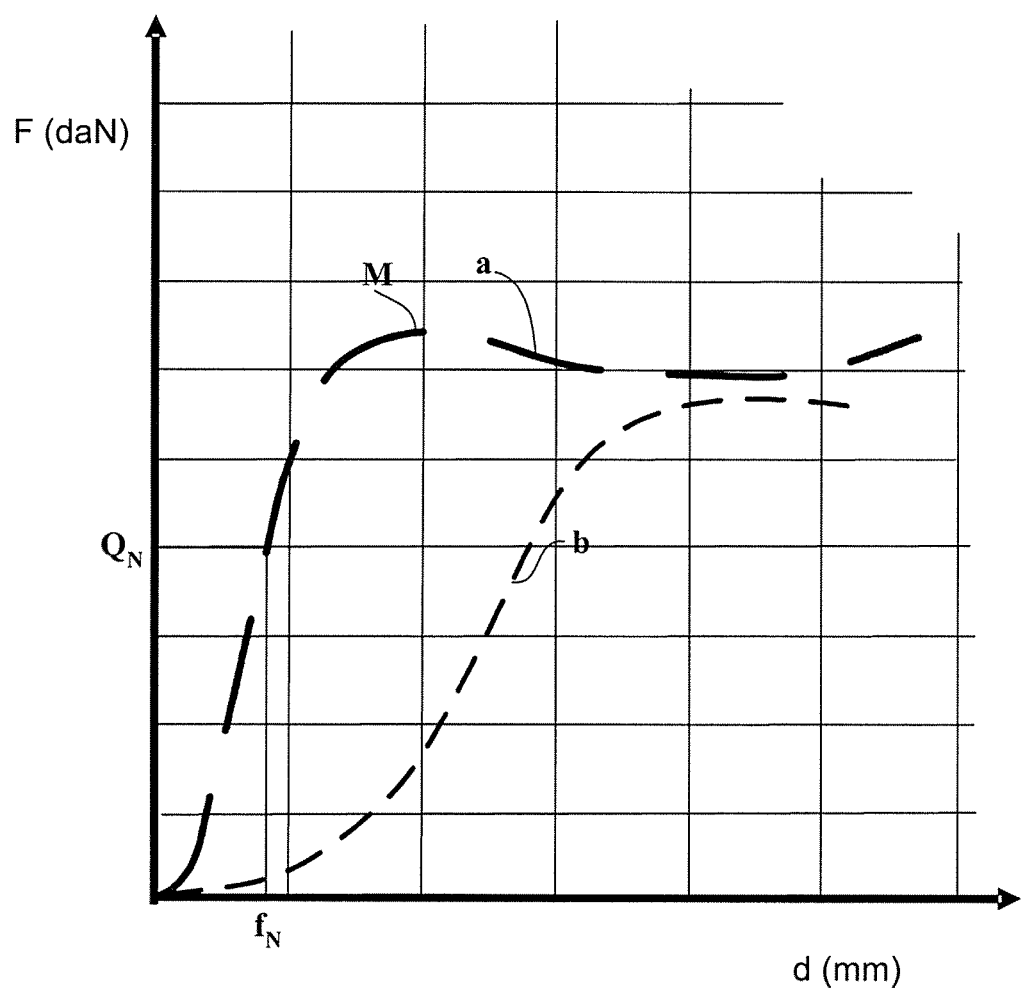
FIG. 15 shows curves relating to crushing of the load-bearing structure of FIG. 1 on flat ground and against a sharp edge.

FIG. 15 shows schematic crushing curves for this support, such as illustrated in FIG. 2, on flat ground (curve a) and a semi-cylindrical indenter (curve b).

Curve (a) shows a very high initial rigidity followed by a pronounced maximum, which corresponds to the appearance of buckling of the partitions 5. The initial high rigidity corresponds to the fact that the partitions alternately oriented relative to the radial direction are sufficiently thick, taking account of their useful height, to support each other during the first crushing phase. It should be noted that a load QN, which the load-bearing structure has to withstand when in service, is situated in this first phase. The structure then exhibits a particularly marked buckling phase, since its effect is a reduction in forces for an increase in displacement beyond point M, the maximum point of the curve. This very marked buckling of the partitions is a very important factor in facilitating crushing of the load-bearing structure on a semicylindrical indenter for example (curve b). At the time of crushing, the buckling allows an elevated indentation distance with relatively weak forces. The load-bearing structures according to embodiments of the present invention thus exhibit optimized behaviors that are entirely comparable to those obtained with supports with radially disposed partitions in terms of initial rigidity and thus loading capacity during flat running while retaining acceptable flexibility in the event of indentation. The result is that behavior under impact is improved distinctly. This result is obtained without any substantial increase in the mass of the support.

Figure 16:
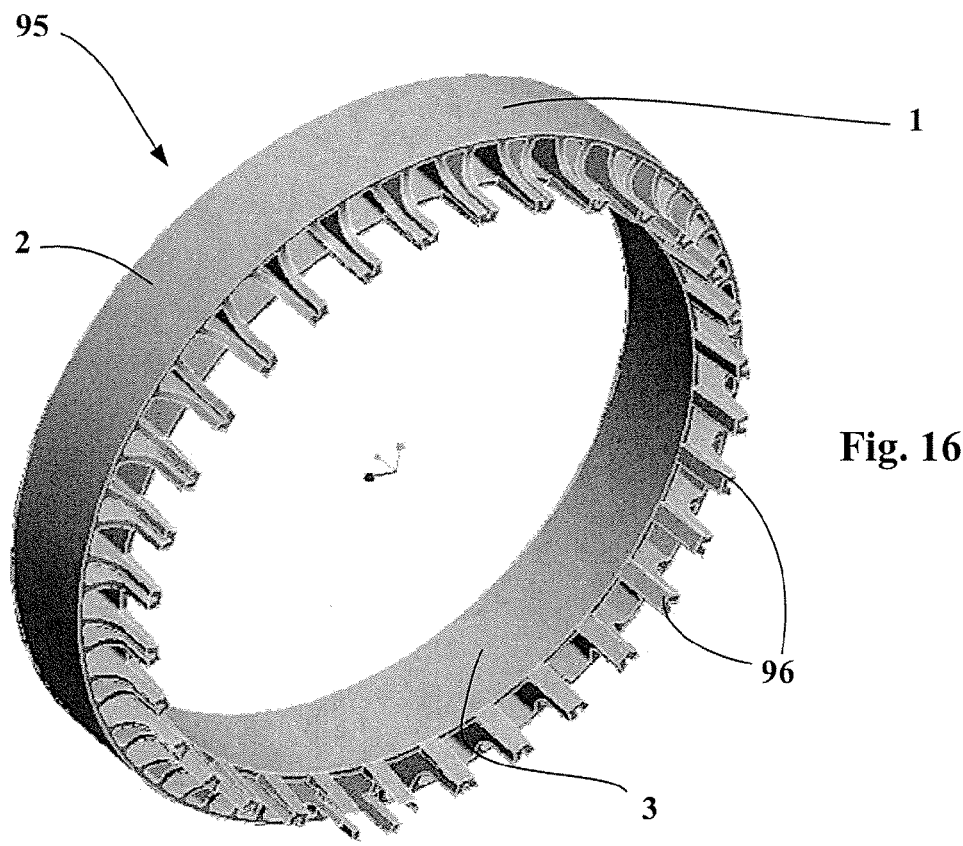
FIG. 16 shows a support that includes tire bead locking elements, according to an embodiment of the present invention.
Figure 17:
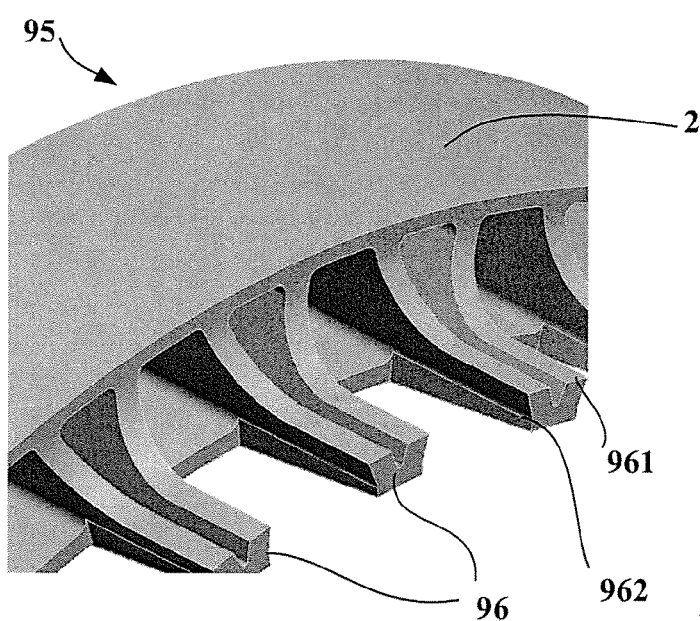
FIG. 17 shows an enlarged view of FIG. 16.

FIGS. 16 and 17 show a support 95 according to an embodiment of the present invention consisting of a load-bearing structure 1 according to any one of the preceding embodiments and locking elements 96 for a tire bead. The elements 96 are arranged axially on one side of the load-bearing structure 1. Each element 96 consists of extensions 961 in this axial direction of two adjacent partitions, disposed in a V at the level of the base 3 of the load-bearing structure, and of an extension 962 of the base, at right angles to the extensions 961. In the example of the embodiment shown, the extensions 961 of the two partitions have a radial height that gradually decreases axially, from the load-bearing structure towards the outside, from substantially the entire annular body to a height adapted as a function of the locking forces to be provided. The function of the locking elements is to cooperate with a safety boss for locking a tire bead in position and demounting the support through the pressure of a mounting roller.

Figure 18:
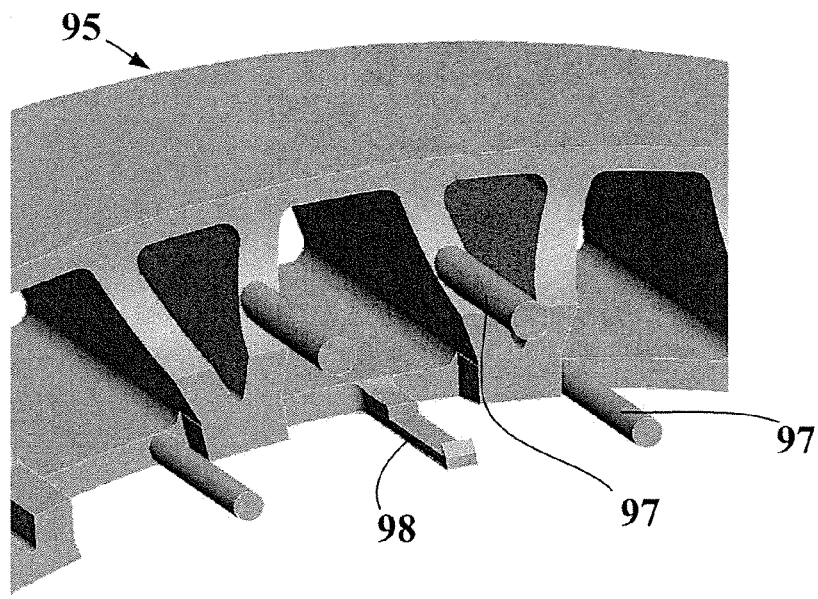
FIG. 18 shows a support with means for mounting a wheel module, according to an embodiment of the present invention.
Figure 19:
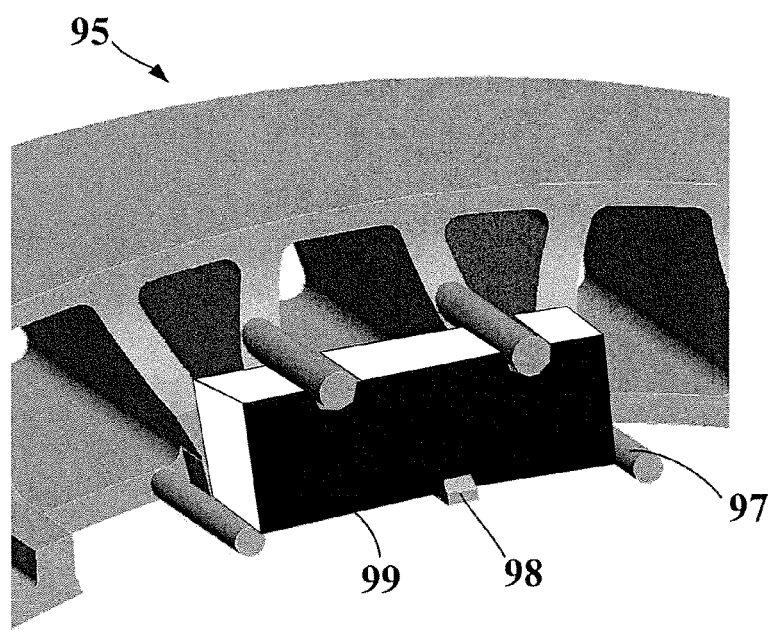
FIG. 19 illustrates a module mounted by locking elements of a support, according to an embodiment of the present invention.

FIG. 18 shows an optional provision of positioning pegs 97, 97 for a wheel module 99 positioned, at a given azimuth, as replacements for the locking elements for mounting a wheel module. An axial locking clip 98 is also provided for locking the wheel module 99 in position after it has been put in place. FIG. 19 shows the wheel module in place on the side of the support 95.

Figure 22:
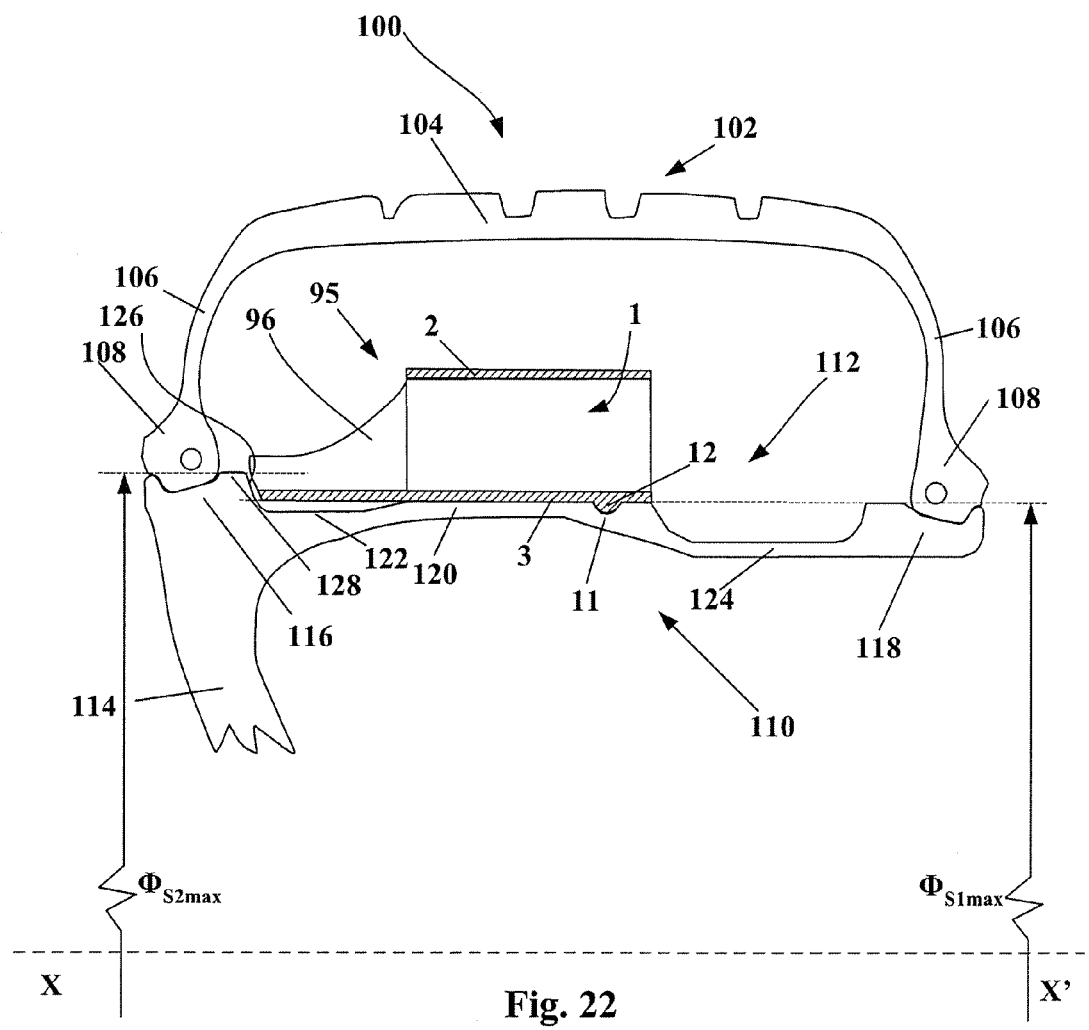
FIG. 22 shows in axial section a support according to FIG. 16, mounted on an adapted wheel rim.

FIG. 22 shows an assembly 100 that includes a tire 102, a wheel 110, and a support 95 according to an embodiment of the present invention. The wheel 110 of this assembly includes a disc 114 and a rim 112 with two seats 118 and 116 of different maximum diameters $\Phi_{S1max}$ and $\Phi_{S2max}$. The connection zone between the disc 114 and the rim 112 is disposed on the side of the seat 116 with the larger diameter $\Phi_{S2max}$. The tire 102 includes a tread 104, two sidewalls 106, and two beads 108 of different diameters suitable for coming to rest on the seats 116 and 118 of the rim 112. The rim 112 includes a support bearing surface 120 around which rests substantially the load-bearing structure 1 of the support 95 and, between the seat 116 and the support bearing surface 120, a circumferential groove 122. The function of this circumferential groove 122 is to accommodate a wheel valve and to make it possible to mount and demount the bead 108 of the tire on the seat 116. The support bearing surface 120 and the base of the load-bearing structure 1 also includes locking means 11, 12 for locking the support 95 in position.

The locking elements 96 of the support 95 come axially almost to bear against the sidewall 126 of the circumferential groove 122. The maximum diameter of the locking elements 96 at their axial end is greater than the diameter $\Phi_{S2max}$ by several millimeters to make it possible to demount the support 96 by means of the axial pressure of a mounting roller. The locking elements 96 thus cooperate with the safety boss 128 of the seat 116 to lock in position the bead 108 of the tire 102.

The invention is not limited to the examples described and illustrated, and various modifications may be made thereto without going beyond the scope thereof, which is limited only by the appended claims.

The invention claimed is:

1. A load-bearing structure for a bearing support to be mounted on a rim inside a tire fitted on a vehicle, the structure being arranged to support a tread of the tire in an event of a loss of inflation pressure, the load-bearing structure comprising:
    a substantially cylindrical base;
    a substantially cylindrical crown; and
    an annular body connecting the base and the crown,
    wherein the body includes a plurality of partitions distributed regularly circumferentially, extending axially substantially from one side to another of the body and radially from the base to the crown with a mean orientation relative to a radial direction,
    wherein two circumferentially adjacent partitions exhibit contrary orientations relative to the radial direction, such that the mean orientation of the partitions is between 10 and 50 degrees, such that two circumferentially adjacent partitions have at most one common zone laid out at the base or the crown, and such that two adjacent partitions define with the base and/or the crown cavities shaped as at least one of: triangles and trapezoids, and
    wherein the base is formed of at least one material whose modulus in extension is greater than a modulus in extension of materials constituting the crown.

2. A load-bearing structure according to claim 1, wherein a ratio between a thickness of each partition in a central portion (E) thereof and a radial height of the annular body (H) is greater than 0.1.

3. A load-bearing structure according to claim 1, wherein two adjacent partitions exhibit mean inclinations of different angles (alpha, beta) relative to the radial direction.

4. A load-bearing structure according to claim 1, wherein the plurality of partitions includes two external walls and an internally disposed median curve, each point of which is equidistant from the two external walls, and wherein the median curve is, at least for a central portion of the plurality of partitions, contained in a same median plane.

5. A load-bearing structure according to claim 4, wherein the two external walls of the plurality of partitions are planar, at least in their central portion.

6. A load-bearing structure according to claim 4, wherein, when two adjacent partitions exhibit an intersection between their median planes disposed radially between the base and the crown, these two partitions are extended radially as far as the base or the crown, as appropriate, by a common part to form a generally Y-shaped portion in all circumferential planes.

7. A load-bearing structure according to claim 4, wherein, for three circumferentially adjacent partitions, a first and a second of the three adjacent partitions have a V-shaped section, such that ends of the V-shaped section are at a level of the crown, L being a circumferential distance separating two points of intersection of median planes of the first and the second of the three adjacent partitions with the crown, and/being a circumferential distance separating points of intersection of median planes of the second and a third of the three adjacent partitions with the crown, such that:

$$0 \le \frac{l}{L} \le 1.$$

8. A load-bearing structure according to claim 7, wherein:

$$0.80 \le \frac{l}{L} \le 1.$$

9. A load-bearing structure according to claim 1, wherein the body includes connecting partitions distributed regularly between two adjacent partitions and oriented circumferentially.

10. A load-bearing structure according to claim 9, wherein the connecting partitions are oriented substantially radially.

11. A load-bearing structure according to claim 9, wherein the connecting partitions constitute a circumferentially continuous web.

12. A load-bearing structure according to claim 9, wherein the connecting partitions connect at least one of: a given fraction of the plurality of partitions, and every second partition.

13. A load-bearing structure according to claim 9, wherein a thickness ratio between a thickness of the connecting partitions e and a thickness of the plurality of partitions E is such that:

$$0.1 < \frac{e}{E} < 0.5.$$

14. A load-bearing structure according to claim 9, wherein the connecting partitions include holes.

15. A load-bearing structure according to claim 9, wherein the connecting partitions are oriented by less than 10 degrees.

16. A load-bearing structure according to claim 1, wherein the plurality of partitions exhibit an axial inclination of several degrees.

17. A load-bearing structure according to claim 16, wherein the axial inclination of the plurality of partitions is less than 10 degrees.

18. A load-bearing structure according to claim 1, wherein the plurality of partitions define, with the base and the crown, cavities whose walls are substantially planar and connected by surfaces with a radius of curvature greater than one millimeter.

19. A load-bearing structure according to claim 1, wherein each of the plurality of partitions includes two parallel partitions connected at each end by a radially oriented partition.

20. A load-bearing structure according to claim 1, wherein the support is formed of a material that includes a rubber mix with a modulus of elasticity of between 10 and 40 MPa.

21. A load-bearing structure according to claim 1, wherein the support is formed of a material that includes a polyurethane elastomer with a modulus of elasticity of between 30 and 400 MPa.

22. A load-bearing structure according to claim 1, wherein the support is formed of a material that includes a thermoplastic elastomer with a modulus of elasticity of between 50 and 800 MPa.

23. A load-bearing structure according to one of claims 21 and 22, wherein the modulus of elasticity is between 50 and 500 MPa.

24. A load-bearing structure according to claim 1, wherein
the load-bearing structure is incorporated in a bearing support,
the base of the load-bearing structure constitutes, at least in part, a base of the support intended to conform to a rim, and
the crown of the load-bearing structure constitutes, at least in part, a crown of the support intended to come into contact with an internal part of a tire situated under a tread portion in an event of a loss of inflation pressure and leaving a clearance relative to the crown at a rated operating pressure of the tire.

25. A load-bearing structure according to claim 1, wherein the load-bearing structure is incorporated in a bearing support that includes a plurality of axially adjacent load-bearing structures.

26. A load-bearing structure according to claim 25, wherein the bearing support includes two axially adjacent load-bearing structures.

27. A load-bearing structure according to claim 26, wherein the plurality of partitions are disposed circumferentially with a pitch p, and wherein a geometry of two half-supports of the bearing support is offset circumferentially by p/2.

28. A load-bearing structure according to claim 25, wherein a first load-bearing structure of the bearing support has partitions oriented relative to an axial direction at different angles alpha and beta, and wherein a second load-bearing structure of the bearing support has partitions oriented relative to a radial direction at angles beta and alpha.

29. A load-bearing structure according to claim 1, wherein the load-bearing structure is incorporated in a bearing support that includes a plurality of radially adjacent load-bearing structures.

30. A load-bearing structure according to claim 29, wherein the bearing support includes two load-bearing structures such that, for each load-bearing structure:
the base of the load-bearing structure disposed radially towards inside constitutes, at least in part, a base of said support;
the crown of the load-bearing structure disposed radially towards outside constitutes, at least in part, a crown of said support;
the crown of the load-bearing structure disposed radially towards the inside coincides with the base of the load-bearing structure disposed radially towards the outside; and
the supporting partitions of the two load-bearing structures disposed radially opposite one another are connected to a common base/crown structure at common azimuths and extend away from the common base/crown structure with contrary orientations relative to a radial direction.

31. A load-bearing structure according to one of claims 24 and 30, wherein the bearing support includes locking elements extending each load-bearing structure axially on one side of said the bearing support.

32. A load-bearing structure according to claim 31, wherein the locking elements axially extend supporting partitions of the load-bearing structures as well as the bases of the load-bearing structures at right angles to the supporting partitions.

33. A load-bearing structure according to claim 31, wherein the locking elements include means for detachably mounting a wheel module.

\* \* \* \* \*

UNITED STATES PATENT AND TRADEMARK OFFICE
CERTIFICATE OF CORRECTION

| | | |
|---|---|---|
| PATENT NO. | : 8,434,533 B2 | Page 1 of 1 |
| APPLICATION NO. | : 12/160540 | |
| DATED | : May 7, 2013 | |
| INVENTOR(S) | : Loïc Albert et al. | |

It is certified that error appears in the above-identified patent and that said Letters Patent is hereby corrected as shown below:

TITLE PAGE [75] INVENTORS:

"Fabien Mondini, Lyons (FR);" should read --Fabien Mondini, Lyon (FR);--.

In the Specification

COLUMN 7

Line 27, "(-a)." should read --(-α).--.

In the Claims

COLUMN 12

Claim 7, Line 5, "and/" should read --and *l*--.

Signed and Sealed this
First Day of July, 2014

Michelle K. Lee
*Deputy Director of the United States Patent and Trademark Office*